UNITED STATES PATENT OFFICE.

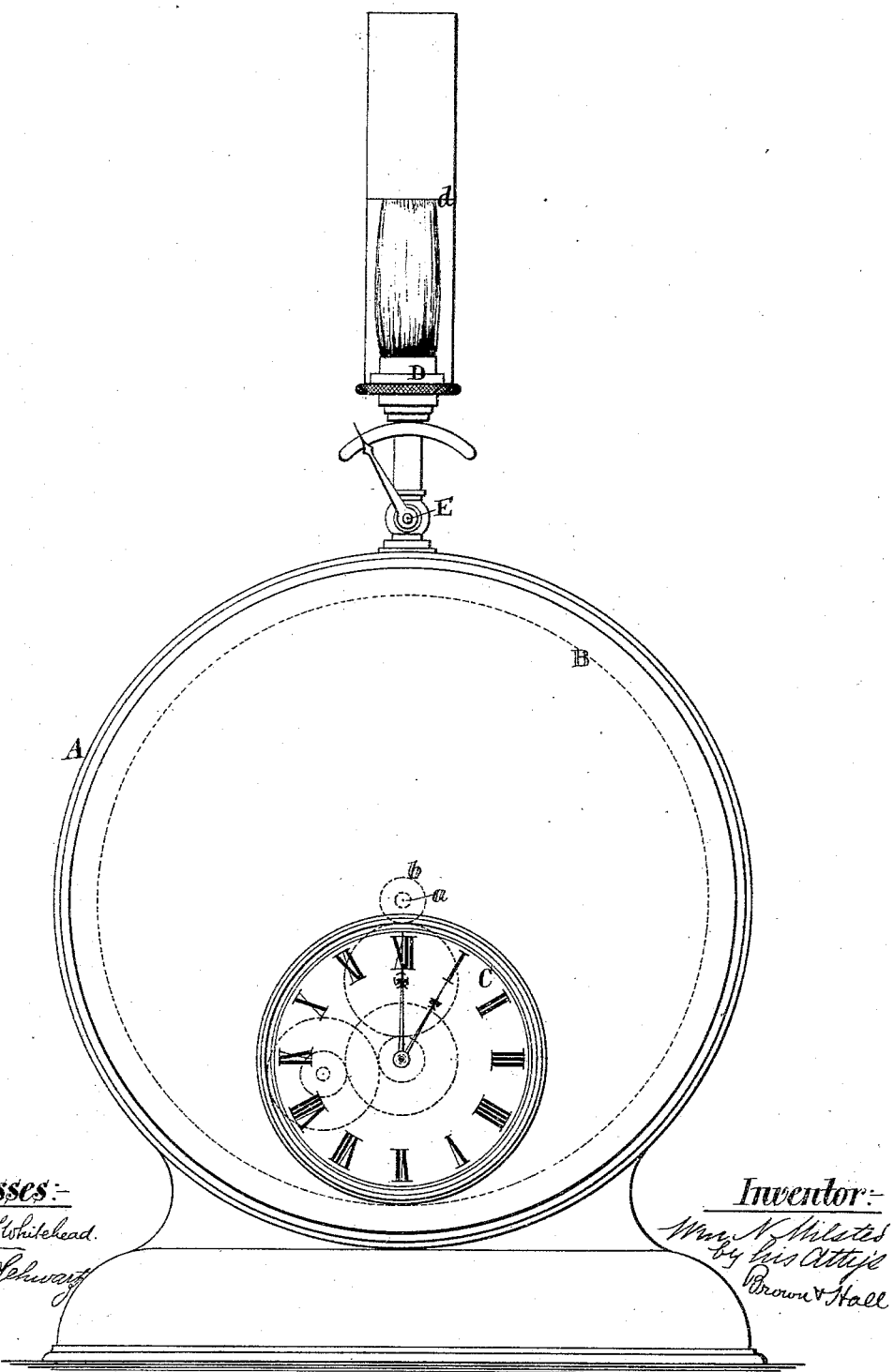

WILLIAM N. MILSTED, OF BROOKLYN, NEW YORK.

GAS-METER.

SPECIFICATION forming part of Letters Patent No. 319,111, dated June 2, 1885.

Application filed June 18, 1884. (No model.)

*To all whom it may concern:*

Be it known that I, WILLIAM N. MILSTED, of the city of Brooklyn, in the county of Kings and State of New York, have invented a new and useful Improvement in Gas-Meters, of which the following is a specification, reference being had to the accompanying drawing.

The object of this invention is to measure or test the quality of the gas used for illumination or as fuel.

The invention consists in the combination of a standard gas-burner, a clock or register furnished with a clock-dial, and a gas meter or motor geared with the clock or register, for the purpose of driving it by the motive power furnished by the pressure of the gas passing through the said meter or motor to the said burner. The passages in the cock of the gas-burner being properly proportioned in their caliber, and the key of the cock being properly set permanently, the quantity of gas at a regulated pressure passing through the meter and the cock to the burner will make the clock or register give the same accurate indication of time as an ordinary clock, and the variations in the richness or quality of the gas will be indicated by variations in the length of the flame from the burner; or if the key of the cock be adjusted as often as may be necessary to keep the flame at as nearly as possible a uniform height, notwithstanding the variations in the richness of gas, such variations are indicated by the time-indication on the dial being either fast or slow, its being fast showing that the gas is below, and its being slow showing the gas to be above, the standard quality.

The figure is a front elevation of a quality gas-meter constructed according to my invention.

A designates the meter or motor, C the clock or register, D the standard burner, and E the cock between the outlet of the meter and the burner.

The meter or motor employed in carrying out my invention may be of various kinds; but the kind which I prefer, and which is represented in the drawing, is precisely like an ordinary wet gas-meter, except that instead of the usual dial-work for registering quantity there is geared with the central shaft, $a$, of the drum B, which is represented by a dotted circle, the time-movement of the clock or register C, which is arranged in front of the meter and attached to the casing thereof in any suitable manner, and which is driven from the shaft $a$ of the meter-drum by a toothed wheel, $b$, on the said shaft. The clock or register might be furnished with an escapement and a pendulum or balance-wheel; but these devices are unnecessary, as the flow of gas permitted through the cock to the standard burner will insure the regularity or isochronism obtained by such devices. The standard burner may be of any suitable kind. That represented is an ordinary Argand burner, having a line, $d$, inscribed on its chimney to indicate the proper height of the flame to be produced by gas of the quality desired. The gas being supplied to the meter at a properly-regulated and uniform pressure, the height of the flame of the burner will always indicate the quality, the richer gas always giving a higher flame; and hence, if the height of the flame increases or diminishes while the clock or register runs to correct time, it is known that the gas is too rich or not rich enough; or, if the height of the flame be kept uniform by giving the burner-cock less or more opening as the height of the flame begins to increase or diminish, the retardation or acceleration of the motion of the mechanism consequent upon diminished or increased flow of gas through the meter will make the clock slow or fast, and therefore indicate a higher or lower quality of gas.

According to the first above-described mode of operation the time-indicating instrument operated by the meter or gas-motor is really a clock, to which the cock E is a regulator, and no comparison with any other clock will be required to ascertain the quality of the gas, though of course the clock will require such comparison with standard time as is required by all ordinary clocks used for time only to test their accuracy; but according to the last-described mode of operation the time-indicating instrument is simply a register, requiring to be compared with a clock whenever the quality of the gas is to be determined.

What I claim as my invention, and desire to secure by Letters Patent, is—

The combination of a standard gas-burner, a clock or register furnished with a clock-dial, and a gas meter or motor geared with the said clock or register, for the purpose of driving it by the motive power furnished by the pressure of the gas passing through the said meter or motor to the said burner, substantially as and for the purpose herein described.

WM. N. MILSTED.

Witnesses:
 FREDK. HAYNES,
 LOUIS M. F. WHITEHEAD.